Feb. 25, 1936.　　　　A. L. LEE　　　　2,032,290
RAIL BOND
Filed Aug. 30, 1933
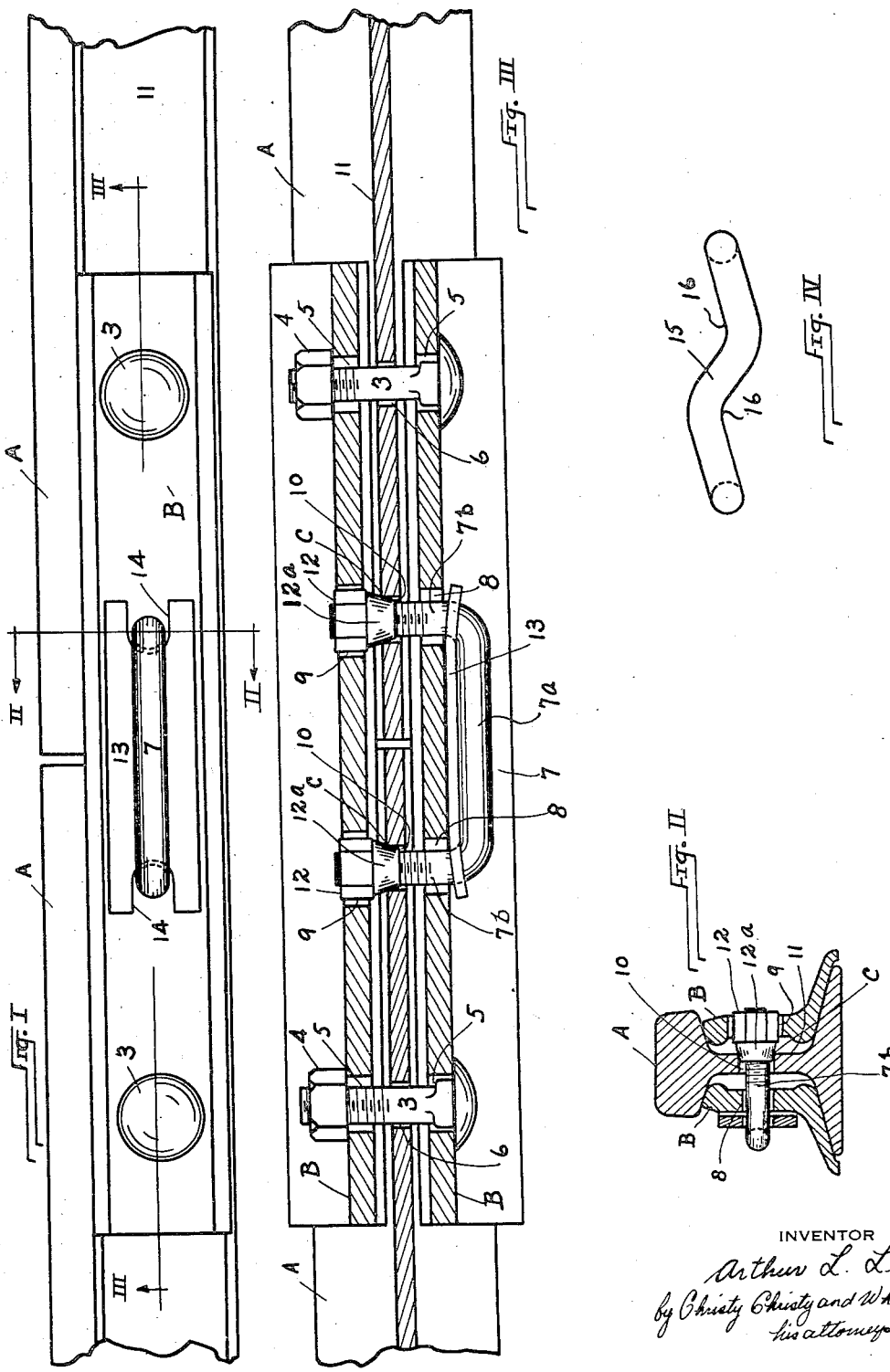
INVENTOR
Arthur L. Lee
by Christy Christy and Wharton
his attorneys Patented Feb. 25, 1936

2,032,290

UNITED STATES PATENT OFFICE 2,032,290

RAIL BOND

Arthur L. Lee, Gibsonia, Pa.

Application August 30, 1933, Serial No. 687,428

3 Claims. (Cl. 173—262)

This invention relates to a rail bond.

The object of the invention is to provide simple means which may be readily applied, without welding or other mode of permanent attachment, to form an electrical connection of good conductivity between adjacent rails.

For railways in which electricity is the motive power, it has been customary to weld lengths of copper bar or wire to adjacent rail terminals, to provide the bond or interconnecting conductor for the lengths of rail. This practice is laborious, and prevents the re-rolling of rails after the rails have become worn, since the bonds are permanently fixed in position and must be cut away from the rail for removal. In mining practice, so much difficulty is experienced in welding copper bonds to adjacent rails, and the bonds are so frequently destroyed by derailment of the cars, with consequent cutting of the bonds by the car wheels, that many lengths of track in mines remain unbonded. This results in lack of proper electrical connection between rails, and frequently results in an arcing between rails, which is dangerous under the existing conditions. It also results in energy loss, overheating of equipment by operation at low voltage with consequent damage to the equipment, and loss of efficiency in the operation of equipment due to power loss.

To explain some of the disadvantages of welding bonds to track used in coal mines, and similar mines, there is an explosion danger from the ignition of gases, by the welding operation, since welding cannot be performed in closed chambers. There is a resulting danger from the welding equipment due to inadequate grounding through the rails. Fire, and explosion, may result from leaving gobs of glowing metal, heated in the welding operation, beside the track.

Electrical welding, aside from fire and explosion hazards, is an inherently dangerous operation, and is particularly so when performed by the high voltage machines used in mine welding.

The difficulty in making a mechanical bond for electrical conductivity between adjacent rails is found in the tendency for such mechanical connections to oxidize under the conditions existing in coal mines and other mines where sulphur or sulphates are present. It has been found that this tendency to oxidation exists even though the material of a mechanically applied rail bond be of bronze, and that the oxidizing tendency destroys the electrical connection provided by the bonds with relatively great rapidity. My mechanical rail bond is so arranged that the region of contact between the rail and the bond itself is subjected to such pressure that oxides cannot be present to impair the direct contact of metal to metal.

In the accompanying drawing, Fig. I is a side elevation showing two adjacent rails bonded in accordance with my invention; Fig. II is a cross-sectional view through one rail and the bond taken on the line II, II of Fig. I; Fig. III is a horizontal sectional view through the bonded rails and my rail bond taken on the line III, III of Fig. I; and Fig. IV is a front elevation of a U-bolt of modified form.

In the drawing, reference letter A designates both of the rails between which electrical connection is made, and reference letter B designates the fish plates or angle bars used for mechanical interconnection of the rails. As is usual, the fish plates or angle bars B are attached to the rails A by means of bolts 3 and nuts 4, the shanks of the bolts 3 extending through matching openings 5 in the angle bars and 6 in the rails. It is to be understood that my bonding structure is separate from and additional to the mechanical interconnection of the rails.

My bonding element comprises a U-bolt 7, which has an elongated bight 7a and shank portions 7b. Shank portions 7b of the U-bolt pass through matching openings 8 and 9 in the two angle bars B, and aligned openings 10 in the web 11 of each of the rails A. Each of the shank portions 7b of the U-bolt carries a nut 12 having a tapered portion 12a presented toward the rail.

It is to be noted as a matter of importance that the rail openings 11, through which the shank portions 7b of the U-bolt pass, are of a diameter appreciably greater than the diameter of the bolt shanks. Also the openings 9 in that one of the angle bars B in which the nuts 12 lie are of such extent that the nuts may lie freely therein, without contacting the walls of the openings.

The procedure in electrically bonding adjacent rails by my mechanical rail bond comprises the positioning of one angle bar B to lap the ends of the abutting rails. This angle bar is the one which lies adjacent the bight 7a of the U-bolt. The shank portions 7b of the U-bolt are then inserted through the openings 8 in this angle bar, and the openings 10 in the webs 11 of rails A. Desirably in making this assembly, a stiff curved spring member 13, provided with notches 14 to embrace the shank portions of the U-bolt, is positioned with its convex side against the outer face of the angle bar. When the connection has been made in the manner to be described, this spring, being distorted by that action, exerts a constant, effective force tending to maintain the close electrical contact between the rails and the bond elements in contact therewith. With the parts in the position described, nuts 12 are applied to the shank portion 7b of the U-bolt, and are tightened down against webs 11 of the rails A, engaging the angle bar B to the rail, and straightening spring 13 as it lies against the outer face of the angle bar.

It has been noted that the openings 10 in rail webs 11 are of a diameter materially greater than the diameter of the shank portions 7b of the U-bolt. Tightening progression of the nuts 12, therefore, causes their tapered portions 12a to enter these openings 10, and to have with the edges of the openings a line contact C. Great pressure may be exerted upon the nuts 12 and the contact area C, between the tapered portions 12a of the nuts, and the edges of the web openings 10 being restricted, the unit pressure in this restricted area is increased, and can be made very great.

As an example, if the nut 12 be provided with a ten-degree taper and a one thousand pounds pressure be applied to the nut, the pressure in the contact area is one thousand times the cosecant of ten degrees, which is 5.7588. The effective pressure is, therefore, 5758.8 pounds. Assuming that the area of contact line C is 0.3 square inch, the unit pressure in the contact area is equal to 5758.8 divided by 0.3, or 19,196 pounds per square inch. An increase in contact area, due to increased nut diameter, is compensated for by increase in applied pressure.

This pressure exceeds greatly the resistance of oxides to crushing, and, therefore, any oxides initially present at the line of contact are forced from this line, so that a true metal-to-metal contact is provided. This close conducting contact is maintained, since under the pressure which is present no oxides may remain in the limited area of contact. The high pressure is maintained by spring 13, which has been distorted in the initial tightening. The stiffness of this spring 13 is such that it tends to exert a reacting pressure equal to the acting pressure longitudinally of the tapered nuts. This compensates for loosening tendencies resulting from wear or oxidation of the parts.

With electrical contact thus made, the second angle bar B is placed in position, with the openings 9 therein embracing the more extended regions of nuts 12. This second angle bar is secured in the assembly by means of the straight bolts 3 and nuts 4. It is to be understood that neither of the angle bars B performs any electrical function in the bonding of the rails, because the close electrical contact is maintained at the contact areas C between the rail webs 11 and the nuts 12.

A detail of relatively great importance resides in the fact that the nuts 12 are heat treated, or are otherwise body or surface hardened, or are of inherently hard metal. When the tapered portion of a hardened nut is forced into the web opening of the rail under great pressure, there is therefore a tendency for distortion of the metal of the rail surrounding the opening rather than a tendency to groove the nut. This relative hardness is of importance, since a groove formed in the tapered face of the nut would destroy the take-up effect resulting from the taper, and would prevent the progressive take-up producing a clean pressure contact.

The entire assembly may, if desired, be made of a corrosion-resisting material, or various suitable corrosion-resisting materials.

While one of the angle bars, as shown, and desirably, does not participate electrically in the bond assembly, my rail bond possesses an advantage, in that it does not hold the angle bars away from the rails. My mechanical rail bond is readily applied, and when applied remains in position for any desired length of time. When removed, it leaves the rails in uninjured condition, and may itself be reused, without repair or alteration.

The pressure under which the true contact between the rail bond and the rail itself exists is of primary importance in effecting and maintaining adequate conductivity between adjacent rails.

The modification shown in Figure IV of the drawing is in the U-bolt, and the purpose of the modification is to compensate for expansion and contraction of bonded rails which are subject to marked temperature changes. This modification is of particular importance in connection with my general structure, in which the nuts are engaged to the rails under such high pressure that slippage cannot occur.

The bight 15 of this modified U-bolt is formed with a double curvature in the regions 16, so that a certain resiliency is provided longitudinally of the bight. I have found that such structure provides adequate compensation for expansion and contraction of adjacent rails under severe variations in atmospheric temperature.

It may be noted that, with my mechanical bonding, the operation of bonding is performed simultaneously with the laying of the track, while welded bonds are made subsequently, and bonding is frequently neglected.

I claim as my invention:

1. In a conducting assembly for electrical current flow from rail to rail, the combination of two abutting rails having each an opening in the web thereof adjacent the end of the rail, a conducting U-bolt having a bight spanning the interval between the web openings of adjacent rails and shanks extended through said openings, a nut on each of said shanks in the region which is projected through the web opening of a rail, a tapered rail-contacting portion on each nut terminally of a cross-sectional area to enter the web opening of the rail contacted by it, the nuts being of a conductive metal which is of a hardness sufficiently greater than the hardness of the rail to cause deformation of the rail metal rather than deformation of the nut metal when the nuts are forced at high pressure into contact with the wall of the web opening, and resilient means exerting a constant force adequate to maintain a high pressure contact between the nuts and the rails.

2. In a rail joint comprising a conductive assembly for electrical current between steel rails, the combination of a conducting U-bolt having a bight adapted to span the interval between web openings in adjacent rails to be bonded electrically each to each and shanks adapted to pass through web openings in adjacent rails the interval between which web openings is spanned by the bight of the U-bolt, tapered nuts on the shanks of the U-bolt and adapted to enter web openings in rails bonded and to contact the web walls surrounding said openings, and a bow spring lying between the shanks of the U-bolt of sufficient stiffness continuously to exert a pressure reactive to pressure exerted by the nuts exceeding the crushing resistance of iron oxides which may form on the rails bonded, said nuts being of a hardness exceeding that of steel rails as used in railway tracks, whereby the nuts are capable of enduring without deformation contact with the rails bonded under pressure adequate to exceed the crushing resistance of iron oxides.

3. In a rail joint comprising a conductive assembly for electrical current between steel rails, the combination of a conducting U-bolt having a bight adapted to span the interval between web openings in adjacent rails to be bonded electrically each to each and shanks adapted to pass through web openings in adjacent rails the interval between which web openings is spanned by the bight of the U-bolt, tapered nuts on the shanks of the U-bolt and adapted to enter web openings in rails bonded and to contact the web walls surrounding said openings, and resilient means lying between the shanks of the U-bolt of sufficient stiffness continuously to exert a pressure reactive to pressure exerted by the nuts exceeding the crushing resistance of iron oxides which may form on the rails bonded, said nuts being of a hardness exceeding that of steel rails as used in railway tracks, whereby the nuts are capable of enduring without deformation contact with the rails bonded under pressure adequate to exceed the crushing resistance of iron oxides.

ARTHUR L. LEE.